Feb. 17, 1942.    A. SCHLEIMANN JENSEN    2,273,800
FLUORESCENT TYPE INDICATOR TUBE
Filed Aug. 9, 1939    3 Sheets-Sheet 1

INVENTOR.
Arne Schleimann-Jensen
BY John J. Rogan
ATTORNEY

Feb. 17, 1942.  A. SCHLEIMANN JENSEN  2,273,800
FLUORESCENT TYPE INDICATOR TUBE
Filed Aug. 9, 1939    3 Sheets-Sheet 2

Arne Schleimann Jensen
INVENTOR.

BY John J. Rogan
ATTORNEY

Feb. 17, 1942.  A. SCHLEIMANN JENSEN  2,273,800
FLUORESCENT TYPE INDICATOR TUBE
Filed Aug. 9, 1939  3 Sheets-Sheet 3

INVENTOR.
BY
ATTORNEY

Patented Feb. 17, 1942

2,273,800

UNITED STATES PATENT OFFICE 2,273,800

FLUORESCENT TYPE INDICATOR TUBE

Arne Schleimann Jensen, Emporium, Pa., assignor to Hygrade Sylvania Corporation, Salem, Mass., a corporation of Massachusetts Application August 9, 1939, Serial No. 289,223

9 Claims. (Cl. 250—27.5)

This invention relates to indicator tubes and more especially to tubes which are known in the radio art as "tuning indicator" tubes or "Magic Eyes."

A principal object of this invention is to improve the indicating characteristics of such tubes.

Another object is to provide an improved electrode arrangement for indicator tubes of the fluorescent target type, such for example as first shown in United States application Serial No. 146,137, filed June 3, 1937, (U. S. Patent No. 2,243,034).

A feature of the invention relates to an indicator tube of the fluorescent target type, wherein the movable boundaries of the fluorescent pattern are more sharply defined.

Another feature relates to a tuning indicator tube of the fluorescent target type, wherein the boundaries between the bright and dark areas of the target are linear throughout substantially all tuning adjustments.

Another feature relates to a tuning indicator tube having means to reduce the effect of secondary electrons from the fluorescent areas, which secondary electrons tend to produce stray fluorescence of the "dark" areas.

Another feature relates to a tuning indicator tube of the type having a target inclined with respect to the cathode and an intermediate deflector electrode, and having an electrode arrangement whereby the unequal distances between the target and deflector electrode are compensated for.

A further feature relates to a tuning indicator tube having a special electrode arrangement for reducing the undesirable effect of stray electrons on the target.

A further feature relates to a tuning indicator tube of the fluorescent target type which is operable on relatively low target voltage or with floating target without loss of definition or uniformity of the fluorescent pattern.

A still further feature relates to the novel organization, arrangement and relative location of parts which constitute an improved tuning indicator tube of the fluorescent target type.

In the drawings, which illustrate certain preferred embodiments of the invention, Fig. 1 is an enlarged diagrammatic view of a portion of the electrode arrangement of a tuning indicator tube of known construction.

Figure 1:
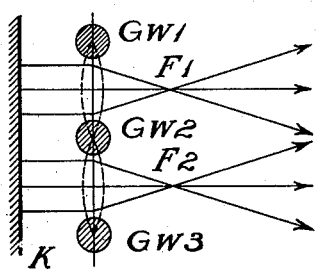

Referring to Fig. 1, there is shown a magnified section of part of the electrode arrangement of one known type of tuning indicator tube wherein a grid coil is arranged around and connected to the cathode, as first disclosed in U. S. Patent application No. 146,137 filed June 3, 1937, (U. S. Patent No. 2,243,034). Outside the cathode-grid system is a cup-shaped target or anode which is given a sufficient positive potential to draw electrons out from the space between the cathode and the grid coil. The field between adjacent grid turns will, under this condition, be positive with respect to the turns of the grid which is tied to cathode. Thus we have, in electron optical terms, a helical converging lens around the cathode, which will cause the electrons to follow paths as indicated diagrammatically on Fig. 1, where K is the cathode, $GW_1$, $GW_2$, and $GW_3$ successive grid turns and $F_1$, $F_2$ focal lines for the two adjacent helical converging lens turns, drawn in the figure.

Figure 2:
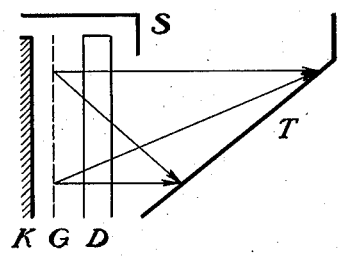
Fig. 2 is another enlarged view of the structure of Fig. 1 showing the effects of the deflector electrode.

As shown, the focal length of the helical converging lens is shorter than the distance between lens and target and, consequently, we will get electrons from different turns of the lens to mostly any single point on the target. Certain conditions being fulfilled, e. g. very short focal length, it is even possible that electrons from the upper and from the lower lens turns meet on the target. This is illustrated on Fig. 2, where K is the cathode, G the grid and T the target. Due to the positive potential on the target, the paths of the electrons will not be absolutely straight lines as indicated on the figure. This is of minor importance for the present discussion, however. The deflector electrode D in the form of a metal strip or vane shown has applied to it a potential which is lower than the potential of the surrounding space. A deflection of the electrons in a direction at right angles to the plane of the paper will result and, consequently, we obtain a shadow behind the deflector.

The velocity of the electrons at any point is proportional to the square root of the potential at the point. Now, it is evident that the potential of the space around the deflector D is not constant over the entire deflector-length. Near the lower end of the deflector, the distance to the positive target is relatively small and consequently, a comparatively high space potential surrounds the deflector. As we go towards the upper deflector end, the potential of the surrounding space first decreases due to an increase in distance to the positive target; a minimum point is then reached and, going further, we find that the space potential increases due to the decrease in distance to the shield S, which is conductively connected to the target, and consequently, is at positive potential. Thus, it is obvious that the speed of the electrons passing the deflector will differ for different passing levels and since the amount of deflection obtained is inversely proportional to the square of the electron velocity, the deflection will assume different values for different deflector passing levels. It has been shown above, however, that electrons to same or nearby target points can arrive over different deflector passing levels. Consequently, irregular edges of the illuminated target section may occur.

Figure 3:
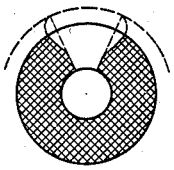
Fig. 3 shows a typical fluorescent pattern obtained with the type of known electrode arrangement shown in Figs. 1 and 2.

The major part of the electrons passing through a single lens turn will only exhibit a relatively small target scattering in a direction parallel to the target symmetry axis, and it has been pointed out above that the amount of electron deflection varies with the deflector passing level. At the bottom of the deflector the deflection will be relatively small due to the high electron velocity in the space around the deflector. At higher passing levels the deflection will increase due to the decrease in electron passing velocity, and near the top of the deflector the deflection will decrease again. The form of the beam edges will, consequently, not be straight lines but curves as shown in Fig. 3. This undesirable effect can easily be seen in any known type "Magic Eye" tuning indicator tube on the market, especially at lower target potentials. Usually the deflection optimum is above the confining line defined by the junction between the cylindrical portion and the tapered or conical portion of the target.

Figure 4:
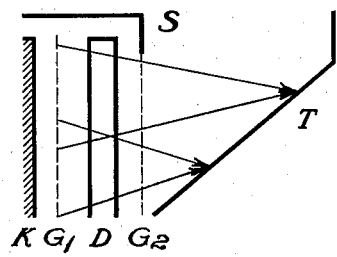
Fig. 4 is an enlarged diagrammatic view of the electrode arrangement of a tuning indicator tube according to the invention.

In accordance with the present invention means are introduced to overcome the undesirable qualities just described. In Fig. 4 there is shown a "Magic Eye" tube structure with the usual cathode K, cathode grid $G_1$, preferably directly connected to the cathode K, deflector D, target T, and shield S. In addition, I have introduced a foraminous grid $G_2$, which is given a positive potential, e. g. the target-shield potential. It is clearly seen that the space potential around the deflector now is uniform over the entire deflector length. Consequently, we will not obtain the curved beam edges on the target shown in Fig. 3. Moreover, in tubes with the auxiliary grid $G_2$, the amount of deflection does not vary with the passing level, since the field around the deflector D, is uniform over the entire deflector length. Consequently, the cause of ragged beam edges, described above i. e. the non-uniformity of the space potential around the deflector, has been removed.

It is realized, that a grid positive with respect to the surrounding space and placed between deflector and target will act as a helical diverging lens for the electrons. The focal length for this lens will have a relatively large value, however, so that no difficulties are caused.

Figure 5:
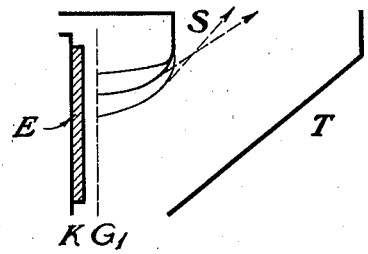
Fig. 5 is a diagrammatic view of the known arrangement to explain the action of the arrangement of Fig. 4 according to the invention.

In tubes of the conventional construction, very undesirable streaks of light appear at times on the illuminated target section as well as on the shadowed part. An investigation showed that the indicator section itself apparently very often causes the target streaks due to electrons going out in the surrounding space to return to, or to cause secondary electrons to go to the inside part of the target over a relatively long path. This assertion is more obvious after a consideration of the distribution of the lines of force in this section of the tube. In Fig. 5 which shows the usual arrangement, K represents the cathode, the coated part E of which is covered by the grid coil $G_1$. Further, S is the light shield and T the target. Apparently, a relatively large number of lines of force will start from the edge of the shield S and consequently they will have rather sharp bends near the shield edge. Generally, the electrons will follow the lines of force. If, however, the lines of force have sharp bends, as is the case near the shield edge, the electron will leave the line of force it is following. Thus, in case of the known "Magic Eye" tube, a number of electrons, which started from the cathode along lines of force from the edge of the shield, S, will leave the lines of force near the edge and continue their flight out in the surrounding space. They may hit the inside wall of the bulb and release secondaries which may end up on the inside part of the target, or the bulb wall may reflect the electrons back to the inside target. In both cases, streaks will most likely result.

Figure 6:
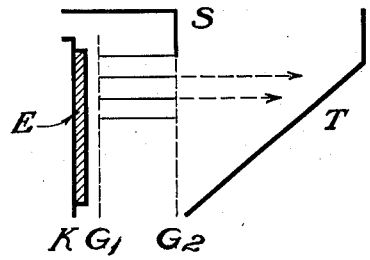
Fig. 6 is another view of the electrode arrangement of Fig. 4 to explain certain features thereof.

Fig. 6 shows the auxiliary grid $G_2$, which eliminates these undesirable effects of the known constructions by an improved distribution of the lines of force. Obviously, here the possibilities for stray electrons have been reduced very considerably by this auxiliary grid and it is clear that the tendency for development of the undesirable target streaks is decreased correspondingly.

It is generally felt that present types of "Magic Eye" tubes are lacking in quality with respect to darkness in the shadowed target section. Unfortunately, the effect becomes worse during the life of the tube, since the brightness of the illuminated target section gradually decreases while the "brightness" of the shadowed section hardly changes. An investigation has shown that fluorescence in the shadow-section of the target is caused by secondary electrons which have been released in the illuminated section.

Figure 8:
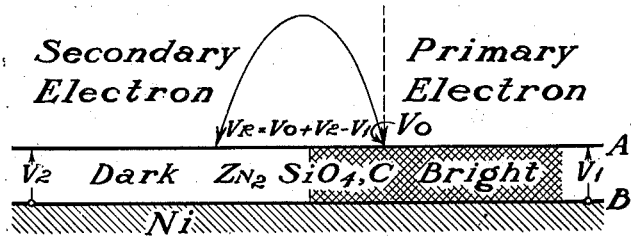
Fig. 8 is a magnified cross-section of part of the target and its coating, useful in explaining certain features of the invention.

In Fig. 8 is shown a cross-section of the target, consisting of a nickel base, Ni, upon which is sprayed a thin layer of willemite, $Zn_2SiO_4$, and carbon, C. The average conductivity through the willemite-carbon layer is poor. Primary electrons, hitting the layer, pass through it to the Ni part of the target and as a consequence of the high resistance through the layer, we obtain a voltage difference $V_1$, between the top and bottom surface of the willemite-carbon layer. This voltage difference will of course be negative at the level A of Fig. 8. Only very few electrons will hit the shadowed target section. Consequently we will only have a very small voltage difference, $V_2$, between the top and bottom surface of willemite-carbon layer in the shadow section. Thus, in case a secondary electron arrives at the dark section from some point in the bright section, where it has been released with an initial velocity corresponding to a voltage $V_0$, it will possess a velocity corresponding to the voltage difference $V_R = V_0 - [V_2 - V_1]$ at the moment it hits the surface of the willemite-carbon layer. We will as an example assume that the electron is released with an initial velocity of 4 volts. $V_1$ may have a value in the neighborhood of $-20$ volts and $V_2$ around $-2$ volts. In this case we will have $V_R = 4 - [-2 - (-20)] = 22$ volts.

Now, the fluorescence threshold for a normal willemite-carbon layer is approximately 15–18 volts. Thus, we see that secondary electrons released in the bright target section with a very low speed, may very well cause fluorescence in the dark target section.

It is a further object of the invention to introduce means for improvement of the poor darkness in the shadowed target section of present "Magic Eye" tube structures, in as much as this undesirable quality, as explained is likely to be caused by secondary electrons released from the illuminated target section.

Figure 7:
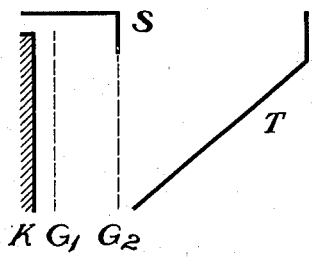
Fig. 7 shows another embodiment of the arrangement of Fig. 4 wherein the target and shield electrodes are structurally insulated.

Fig. 7 shows how this can be accomplished in practice. The cathode is K, cathode-grid $G_1$, shield S, and target T. Moreover we have in accordance with the invention the auxiliary grid $G_2$, which in this case preferably is connected to the shield S but insulated from the target T, so that different potentials can be applied to the target T and the shield-auxiliary grid assembly $SG_2$ respectively.

With the target "floating" and a suitable voltage applied to the shield-auxiliary grid assembly $SG_2$, primary electrons hitting the target will cause secondary electrons to go from the target to the positive auxiliary grid in a sufficient number to make the target assume a potential only slightly lower than that of $SG_2$, as is well known from cathode ray tubes with floating fluorescent screen.

The potential of our floating target will adjust itself to such a value that the potential difference between the auxiliary grid $G_2$ and target T just is sufficient to make the ratio of secondary electrons leaving the target to the primary electrons arriving there equal to unity. If the target potential becomes higher, the secondaries can not run against the negative field and primary electrons arriving at the target will stay there and cause the target potential to drop. Should the target voltage become smaller, a larger number of secondaries will be drawn from the target to the auxiliary grid $G_2$ by the stronger positive field and target potential increases.

In practice, it is impossible to avoid a small additional leakage current between target and other electrodes in the tube. However, this leakage current can be kept so low that it hardly gives rise to any voltage drop through the willemite-carbon target layer.

Consequently a tube in actual operation will have practically the same voltage at the top surface of the willemite-carbon layer in the shadowed section and in the illuminated section. Secondary electrons produced at the illuminated section of the target arriving at a point in the shadowed section will therefore practically have their initial speed only, which we assumed above of the order of 4 volts. This speed is too low to cause visible fluorescence of the shadow darkness, as is also confirmed by visual observations.

If the target T of the tube structure Fig. 7 is given a suitable positive potential lower than that to which the floating target adjusts itself, it is possible to operate the tube with a negative target current. In this case the ratio of secondary electrons drawn from the target to the more positive auxiliary grid, to primary electrons becomes greater than unity. Hence the current through the bright section of the willemite-carbon layer has now a direction opposite to that in the conventional "Magic Eye" tube, and the potential drop $V_1$ in the fluorescent layer is reversed, i. e. the value of $V_1$ becomes now positive, and is not negative as in the case explained hereinabove. The voltage $V_2$ in the dark section still has a small negative value, since the electrons arriving there are substantially low speed secondaries which cannot produce new secondaries.

Correspondingly, the secondary electrons from the bright willemite-carbon layer have to move against a negative electric field in order to reach the shadowed section and we get still fewer secondaries to the target shadow section than we got in the case where we did not have any target current at all. Consequently the potential difference between the shadowed and the bright target section becomes still smaller and the safety factor for shadow darkness is greater than for zero target current.

Figure 10:
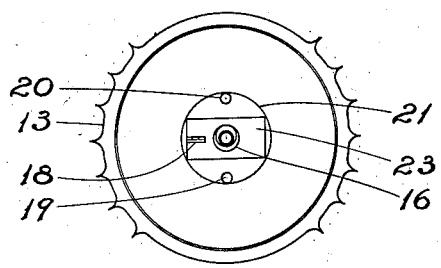
Fig. 10 is a top plan view of the electrode arrangement of Fig. 1 with the light shield removed to show more clearly the electrode arrangement.
Figure 9:
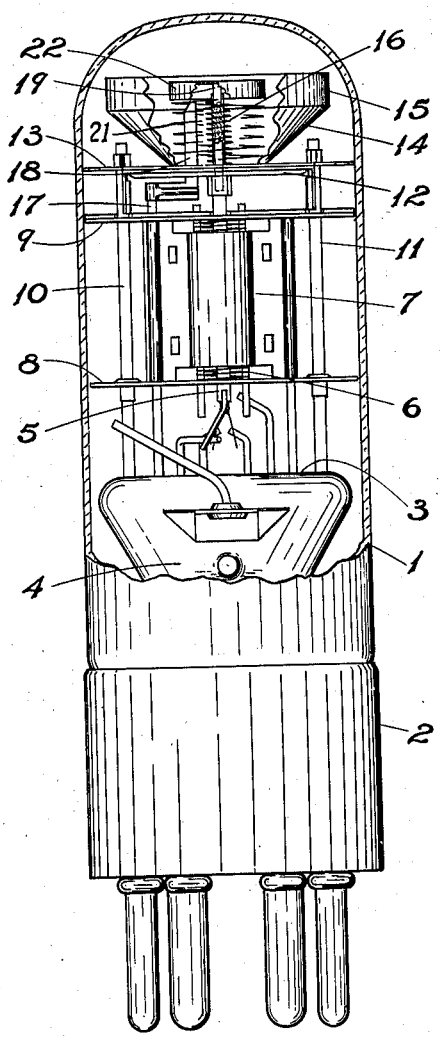
Fig. 9 is an elevational view, partly sectional, of a typical complete tube embodying features of the invention.
Figure 14:
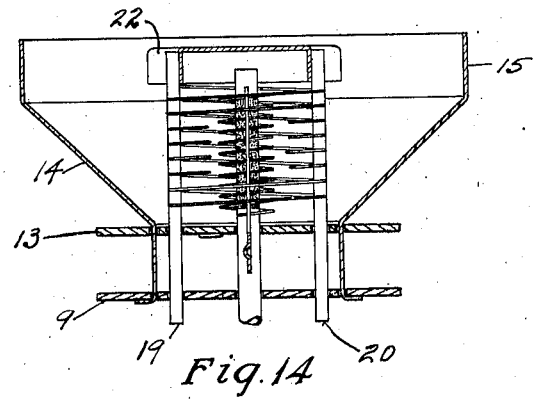
Figs. 14 and 15 are detailed views of the manner of supporting the tuning indicator electrodes for "floating target."
Figure 15:
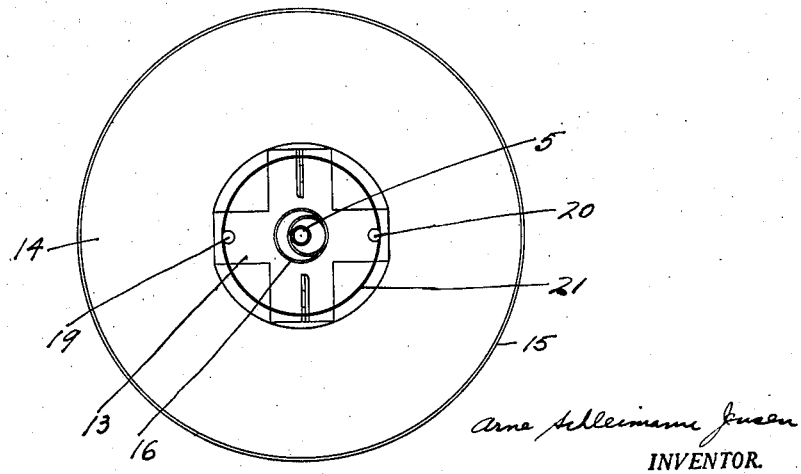

Referring to Figs. 9 and 10 there is shown one form of complete tube embodying an amplifier section and tuning indicator section, mounted vertically above one another so that the luminescent target is adjacent the upper end of the glass enclosing envelope 1. The envelope 1 is preferably highly evacuated and is provided with any well known form of pronged contact base 2. Supported on the press 3 of the reentrant stem 4 is any well known form of tube mount. Merely for purposes of explanation the mount is of the triode type, including an indirectly heated cathode sleeve 5, a control grid 6, and a tubular plate or anode 7 which is supported between a pair of mica discs or spacers 8, 9, in the well known manner. Preferably the entire assembly is supported by a pair of metal rods 10, 11, to which the mica discs are fastened. The rods 10, 11, have fastened to their upper ends a metal strip or disc 12 and a peripherally toothed mica disc 13 which engages the bulb wall to steady the assembly. Fastened to the metal strip 12 is the cup-shaped metal target having a frusto-conical portion 14 and a cylindrical portion 15. The members 12 and 13 and the bottom wall of the target have central openings 23 through which passes centrally the upwardly extended end of the cathode sleeve 5. The upper end of the cathode sleeve is coated with electron emissive material and may be provided with a pair of outwardly projecting lugs (not shown) to which the ends of the helical grid 16 are attached. Fastened to the upper end of the plate side rod 17 is an L-shaped vane or deflector electrode 18 which projects through the opening 23 so as to be insulated from the cathode and from the grid 16 and the target. Also fastened to the metal strip 12 are a pair of short metal uprights 19, 20, around which is wound the field control grid 21. Also fastened to the upper ends of uprights 19, 20, is the light shield 22 which preferably has its upper outer surface blackened in a well known manner. The entire inner surface of the target is coated with any well known material which fluoresces under electron impact, such as the willemite-carbon layer above described. In the embodiment of Fig. 9 therefore the auxiliary grid 21 is at the same potential as the target and the light shield 22. Where it is desired to impress a different potential on the target as compared with the auxiliary grid, as mentioned above in connection with Fig. 7, the target can be insulatingly supported on the discs 9 and 13 with respect to the members 19, 20, (see Fig. 14) and a separate lead (not shown) may be brought out from the target, or it may be left floating as above described.

Figure 12:
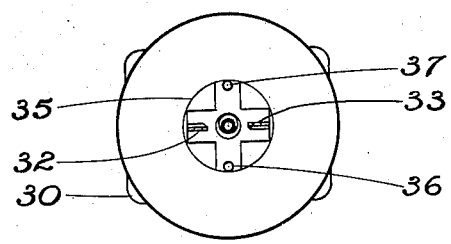
Fig. 12 is a top plan view of the electrode arrangement of Fig. 11 with the light shield removed to show the electrode structure more clearly.
Figure 11:
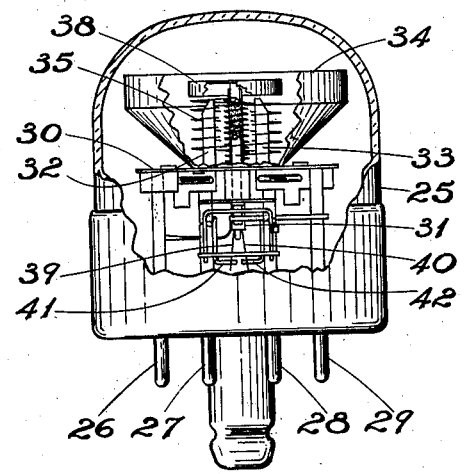
Fig. 11 is an elevational view, partly sectional, of a "Magic Eye" tube employing a pair of deflector electrodes.

Figs. 11 and 12 show the tuning indicator assembly mounted in a tube of the stemless type, for example as is disclosed in application Serial No. 189,295 filed February 8, 1938, wherein the glass bulb 25 is sealed at its lower end to a substantially flat glass disc or button and through which latter a plurality of rigid metal prongs 26, 27, 28, 29 are directly sealed. Supported on the upper ends of prongs 26, 29, is a mica disc 30 which is provided with a central opening similar to opening 23 (Fig. 10) to allow the cathode sleeve 5 and the two L-shaped deflector electrodes 32, 33 to pass freely. Fastened to disc 30 is a cup-shaped target 34 whose inner surface is coated with material which fluoresces under electron impact. Also supported on the disc 30 is the auxiliary grid 35 which is wound around a pair of short metal side rods 36, 37, to the upper ends of which the light shield 38 is attached. The heater filament ends 39, 40, are connected to metal straps 41, 42 fastened to filament prongs which are located diametrically opposite to prongs 27, 28.

Figure 16:
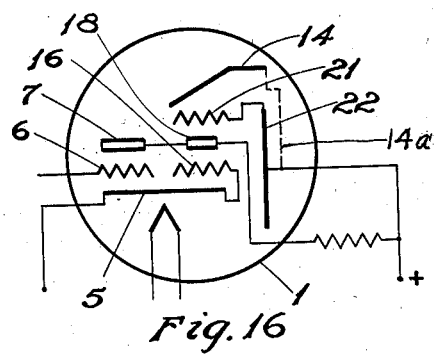
Fig. 16 is a schematic diagram of a typical circuit arrangement useful with the invention.
Figure 13:
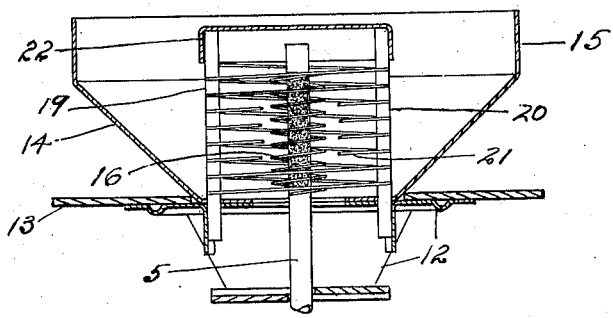
Fig. 13 is a partly sectional enlarged view of the manner of supporting the tuning indicator electrodes, taken at right angles to that of Fig. 9.

Fig. 16 shows a simple circuit connection of the new voltage indicator which comprises a triode section. Numeral 5 represents the common cathode, 6 the grid and 7 the plate of the triode section. Plate voltage (+) is applied to plate 7 of the triode and control fin 18 of the tuning indicator section over a resistor. The same positive voltage is directly applied to the auxiliary grid 21 of the tuning indicator, and to the shield electrode 22. Target 14 may float, or may be connected to the positive voltage (+). The two alternatives are indicated in the drawing by the broken line 14a, which may be interpreted either as a metallic connection or as an insulating support or spacer.

What I claim is:

1. An indicator tube comprising an envelope enclosing an electron emitter, a target which fluoresces under electron impact from said emitter, a deflector electrode between the emitter and target for controlling the fluorescent pattern on said target, and a foraminous electrode between the deflector electrode and target and electrically connected to the target for insuring substantially uniform distribution of the lines of force between said deflector and said target.

2. A tuning indicator tube comprising an electron emitter, a grid surrounding said emitter, a target which fluoresces under electron bombardment from said emitter, a deflector electrode for controlling the production of a variable area luminous pattern on said target, and a foraminous field control electrode between the deflector electrode and the target, and electrically connected to said target.

3. A tuning indicator tube comprising a central electron emitting cathode, a cup-shaped target which fluoresces under electron impact, and a foraminous grid electrode surrounding said cathode and connected to said target.

4. A tuning indicator tube comprising a central electron emitting cathode, a grid surrounding said cathode, another grid surrounding the first grid, a deflector electrode mounted between said grids, and a tubular target which fluoresces under electron impact surrounding said second grid.

5. A tuning indicator tube according to claim 4 in which said second grid is electrically connected to said target.

6. A tuning indicator tube according to claim 4 in which said target is insulatingly mounted with respect to said second grid.

7. A tuning indicator tube according to claim 4 in which said target is insulatingly mounted with respect to said second grid and is adapted to be maintained at a lower potential positive potential with respect thereto.

8. A tuning indicator tube according to claim 4 in which a light shield is mounted concentric with respect to said target, said light shield having a downwardly depending flange to which said second grid is attached.

9. A tuning indicator tube for tunable radio circuits and the like comprising an envelope containing a target having a coating which fluoresces under electron bombardment, cathode means to develop a stream of electrons flowing to said target, a first grid surrounding said cathode means to act as an electron lens on the electron stream, a deflector electrode between said grid and target, and another grid located between said deflector and target for rendering the space potential adjacent the deflector substantially uniform.

ARNE SCHLEIMANN JENSEN.